United States Patent
Bellosta Von Colbe et al.

(10) Patent No.: US 11,329,299 B2
(45) Date of Patent: May 10, 2022

(54) GAS CIRCULATION SYSTEM FOR TRANSPORTING HEAT FROM A HIGH TEMPERATURE SOURCE

(71) Applicant: Helmholtz-Zentrum Geesthacht Zentrum für Material- und Küstenforschung GmbH, Geesthacht (DE)

(72) Inventors: José Bellosta Von Colbe, Wentorf (DE); Thomas Klassen, Wentorf (DE); Martin Dornheim, Reppenstedt (DE); Giovanni Capurso, Geesthacht (DE); Klaus Taube, Hamburg (DE)

(73) Assignee: Helmholtz-Zentrum hereon GmbH

( * ) Notice: Subject to any disclaimer, the term of this patent is extended or adjusted under 35 U.S.C. 154(b) by 472 days.

(21) Appl. No.: 16/395,881

(22) Filed: Apr. 26, 2019

(65) Prior Publication Data
US 2019/0363378 A1    Nov. 28, 2019

(30) Foreign Application Priority Data
May 22, 2018  (EP) .................................... 18173615

(51) Int. Cl.
*H01M 8/04*       (2016.01)
*H01M 8/04089*    (2016.01)
*H01M 8/04746*    (2016.01)

(52) U.S. Cl.
CPC ... *H01M 8/04097* (2013.01); *H01M 8/04753* (2013.01)

(58) Field of Classification Search
CPC ......... H01M 8/04097; H01M 8/04753; H01M 8/12; H01M 8/04208; H01M 2008/1293; H01M 8/04067; H01M 8/04014; Y02E 60/50

USPC ......................................................... 429/217
See application file for complete search history.

(56) References Cited

U.S. PATENT DOCUMENTS

2011/0300457 A1*  12/2011  Kuehn ................ H01M 8/0662
429/410

FOREIGN PATENT DOCUMENTS

| DE | 102006002882 A1 | 8/2007 |
| EP | 1754880 A1 | 2/2007 |
| EP | 2756536 A1 | 7/2014 |
| WO | 2013-038144 A1 | 3/2013 |

* cited by examiner

*Primary Examiner* — Gary D Harris
(74) *Attorney, Agent, or Firm* — Nields, Lemack & Frame, LLC

(57) ABSTRACT

The invention relates to a gas circulation system (1) for transporting heat from a high-temperature source (5) to a heat consumer (7), having a pipe system (2), through which a gaseous heat transfer medium flows, wherein part of the pipe system (2) is formed as a heat exchanger (4) following on from the high-temperature source (5), in which heat is transferred from the high-temperature source (5) into the heat transfer medium, and wherein part of the pipe system (2) is formed as a heat sink (6), in which the heat transferred to the heat transfer medium can be transferred to a heat consumer (7), or as a heat consumer. One or more gas flow enhancers (8) functioning according to the Coandă effect and/or the Venturi effect, which are supplied with pressurized impulse gas, are provided in the pipe system (2), in order to propel the heat transfer medium in the pipe system (2) in a flow direction (3).

14 Claims, 1 Drawing Sheet

GAS CIRCULATION SYSTEM FOR TRANSPORTING HEAT FROM A HIGH TEMPERATURE SOURCE

TECHNICAL FIELD

The invention relates to a gas circulation system for transporting heat from a heat source, in particular a high-temperature source, such as a high-temperature fuel cell, to a heat consumer, wherein the gas circulation system comprises a pipe system through which a gaseous heat transfer medium flows. Part of the pipe system is formed as a heat exchanger, in which heat from the heat source is transferred into the heat transfer medium. Another part of the pipe system is formed as a heat sink. Here, the heat transferred to the heat transfer medium can be transferred to a heat consumer as needed, or the heat sink is formed as a heat exchanger.

BACKGROUND OF THE INVENTION

The discussion around future ecologically and economically promising energy economy has for some years been increasingly concentrated on efficient solutions also for transporting heat, in which high losses can occur. The developments are taking place in various technical sectors, for example in the field of industrial or domestic combined heat and power or in the automotive sector, in each case with the aim of obtaining an increase in efficiency of the overall process.

In the field of power generation, the potential of fuel cell technology has been recognized for some years and efforts are being made to obtain and use power and heat therefrom effectively. Fuel cells are galvanic cells which convert the chemical reaction energy of a continuously supplied fuel and an oxidant with simultaneous generation of heat into electrical energy. Solid oxide fuel cells (SOFCs) are high-temperature fuel cells which are operated at an operating temperature of 650-1000° C. and which are pre-eminently suitable for combined heat and power generation because of their high degree of efficiency and low pollutant emissions.

Metal hydride storage systems have proved to be particularly suitable for storing the fuel. These metal hydride storage systems function at very low operating pressures. This makes the storage system safe and compact. Storing fuels, such as hydrogen, in metal hydrides allows a storage which is as loss-free as possible over a long period of time without additional energy expenditure, as the gas is chemically bonded and cannot escape. For safety as well, metal hydride storage systems are much more suitable than compressed gas or liquid hydrogen storage systems, as the hydrogen cannot escape explosively.

Recent developments are moving on to thermally coupling the fuel cell to the metal hydride tank. One of the reasons for this is that the dehydrogenation—thus the release of hydrogen from the hydride—is an endothermic reaction. The waste heat of the fuel cell can thus be used to initiate the chemical dehydrogenation and thus to release the hydrogen, which is then converted to electrical energy in the fuel cell.

For the transport of heat from a heat source to a heat consumer (or storage system), it is already known to use a gas flow system, in which a heat transfer medium flowing in a pipe system is heated by the heat source and emits this heat to the consumer. Heat exchangers are used for the respective heat transfer. High-temperature fans are needed to keep the gas flow flowing. However, these fans are expensive and, because of the moving parts, very susceptible to wear and failure. Problems arise when solids occur in the gas line. These can lead to damage of the moving parts.

SUMMARY OF THE INVENTION

The object of the invention is to reduce the gas circulation system's need for maintenance and susceptibility to wear, and to increase its efficiency.

This object is achieved by a gas circulation system with the features of claim 1.

According to the invention it is provided that one or more gas flow enhancers functioning according to the Coandă effect and/or the Venturi effect are provided in the pipe system in order to have an effect on the gas flow. The gas flow enhancer is supplied with pressurized impulse gas from an impulse gas line in order to propel the heat transfer medium in a flow direction, thus to accelerate the gaseous heat transfer medium in the intended flow direction or to propel the gas flow.

Because of the gas flow enhancer the heat transport system dispenses with moving parts, can be exposed to very high temperatures problem-free and is less susceptible to failure, and in addition saves costs. The maintenance procedures are also less extensive. Via the heat exchanger the heat from the heat source is absorbed and emitted to the heat transfer medium flowing therein. The heat transfer medium continues to flow up to the heat sink, which denotes a spatially limited area or body where the thermal energy in the heat transfer medium is emitted outwards again, for example to the heat consumer. For this, the heat sink can be formed as a heat exchanger.

The gas flow enhancer can be based on the Coandă effect. Such flow enhancers are also known from the state of the art by the term "air amplifier". The Coandă effect describes the tendency of a gas flow to run along a convex surface instead of becoming detached and moving further in the original flow direction. For this, the gas flow enhancer comprises a nozzle body with a flow channel which has an annular gap on its inner surface. The annular gap is supplied with the pressurized impulse gas from an annular chamber formed in the nozzle body. Following the annular gap in the flow direction, thus viewed in the axial direction of the gas flow enhancer or of the flow channel, the flow channel forms a Coandă control surface which is configured in such a way that the impulse gas flow is deflected in the flow direction. Viewed in the flow direction (or axial direction of the flow channel), the Coandă control surface is arranged behind the outlet for the impulse gas. The Coandă control surface is characterized in that it runs, starting from the annular gap, at least in part diagonally to the centre axis of the nozzle body, or diagonally to the flow direction of the heat transfer medium. Due to the Coandă effect the impulse gas does not flow radially onto the centre axis of the nozzle body, but is axially deflected by the Coandă control surface. In the centre of the gas flow enhancer a negative pressure thereby forms, which "entrains" the heat transfer medium in the axial direction and accelerates it.

Alternatively or in combination with structural features for achieving a Coandă effect, the gas flow enhancer can be based on the Venturi effect. Venturi nozzles are known from the state of the art and comprise: an inlet nozzle which is supplied by the impulse gas, a mixing chamber and a diffuser, wherein the inlet nozzle is pointed at the diffuser through the mixing chamber and the mixing chamber has an inlet which is connected to an outlet of the pipe system. The diffuser is connected to an inlet of the pipe system (outlet of the Venturi nozzle), with the result that the Venturi nozzle with inlet and outlet is integrated in the pipe system. Such gas flow enhancers are also known by the name jet pump. The impulse gas coming from the inlet nozzle generates a pumping action in the mixing chamber, whereby the heat transfer medium is sucked through the inlet of the mixing chamber, accelerated and conveyed from the diffuser into the pipe system.

According to a further embodiment of the invention the Coandă control surface is formed curved in the flow direction. This means that the Coandă control surface has a convex surface which initially runs, starting from the outlet for the impulse gas, in the direction of the centre axis of the nozzle body, but then increasingly descends in a direction parallel to the centre axis.

A further embodiment of the invention provides that the gas flow enhancer, in the flow direction of the heat transfer medium, has an inlet opening with an inlet cross-sectional area which tapers in the axial direction in particular conically up to a cross-section narrowing with a minimal passage surface area. An acceleration of the heat transfer medium already occurs in this nozzle section. The annular gap preferably follows the cross-section narrowing, with the result that the subsequent acceleration of the heat transfer medium by the impulse gas stream is particularly effective.

According to a further embodiment of the invention a section with an inner diameter which widens in the flow direction follows the Coandă control surface in the flow direction.

According to the invention the heat transport system is provided as a circuit. Here the gas flow enhancer can be arranged in front of or behind the heat source-heat exchanger section in the flow direction of the heat transfer medium. However, it is perfectly conceivable to provide a plurality of gas flow enhancers in the pipe system in order to guarantee a constant gas flow.

The gas flow enhancer is preferably arranged in front of the heat source in the flow direction, in order to keep the thermal load low. A further advantage is that the impulse gas flow needs to be less highly preheated, with the result that the size of the heat exchanger for preheating the impulse gas can also be minimized.

The heat transfer medium can be air or another suitable gaseous medium.

The gas circulation system can particularly advantageously be used as a heat dissipation system for high-temperature fuel cell systems. It has been shown that the dissipation of heat, in particular of battery heat, in particular from high-temperature fuel cells, such as a solid oxide fuel cell (SOFC), by means of the closed gas circulation system has a high degree of efficiency.

A further embodiment of the invention provides that a waste gas flow of the high-temperature fuel cell is guided over the heat exchanger. In this way the thermal energy of the fuel cell can be used efficiently.

According to a further embodiment of the invention it is provided that a metal hydride tank is connected to the heat sink, with the result that heat can be exchanged between the heat transfer medium and the metal hydride tank. For a thermal coupling of heat sink and metal hydride tank, at least one section of the metal hydride tank and/or heat sink can be formed as a heat exchanger for the purpose of efficient heat exchange. The heat of the fuel cell can thus be efficiently guided into the metal hydride tank and used there to release the fuel. This increases the overall degree of efficiency of the composite system of fuel cell/metal hydride tank. Alternatively, a further heat exchanger can be arranged between heat sink and metal hydride tank, in order to exchange the heat between the two. Such an additional heat exchanger can be based in particular on a liquid heat transfer medium. The liquid exchange medium, unlike the gas flow, has the advantage that at a correspondingly high flow rate the liquid is not heated so intensively, and thereby problems which can be associated with the high temperatures (e.g. material weakening or decomposition of the heat carrier) are avoided.

In principle, the system can have several heat sinks or coupling sections for heat consumers. In principle, several metal hydride tanks can also be connected to the system.

A further embodiment of the invention provides that a gas or air heater is provided in the pipe system. The air heater can be, for example, an electric tubular heater. By means of the air heater, the heat transfer medium can be heated in order thus to compensate for any heat losses. Furthermore, the air heater can be used to raise the temperature of the system, or to bring it to the operating temperature. In particular when the high-temperature source is not yet providing sufficient heat, the heat generated via the air heater (or gas heater) can be introduced into the metal hydride tank via the section of the pipe system which is thermally coupled to the metal hydride tank.

According to the invention it is provided that a pressurized impulse gas flow is guided into the gas flow enhancer in order to entrain the gas flow in the axial direction. In order to preheat the impulse gas flow and to limit/compensate for any heat losses, a further embodiment of the invention provides means for preheating the impulse gas flow. These means can be provided between the source of the impulse gas flow and the gas flow enhancer. A heat exchanger or an electric tubular heater can be used for this.

According to a further embodiment of the invention the pipe system comprises an outlet in order to drain off some of the gaseous heat transfer medium from the system. By means of the outlet, it is possible, for example, to compensate for a temperature-induced pressure increase in the gas circulation system. Above all, however, the outlet can be used to avoid an accumulation of gas in the pipe system. Such an accumulation can lead to a pressure increase and thus can potentially also impair the impulse gas flow if the pressure becomes too high, with the result that an impulse can no longer be transmitted. For this embodiment it is furthermore preferably provided that a flow of the heat transfer medium which can be discharged via the outlet is used to heat the impulse gas flow. For this, the outlet of the pipe system, through which heat transfer medium can be drained off from the pipe system, can be connected to the means for preheating the impulse gas flow, which can be provided in the form of a heat exchanger, with the result that the heat of the heat transfer medium discharged via the outlet can be transferred to the impulse gas in order to preheat it.

According to a further embodiment of the invention, as an alternative or additional procedure for preheating the impulse gas flow, the outlet can also be used to recycle the drained-off heat transfer medium into the circulation system as impulse gas. According to this embodiment the gas flow enhancer is connected to the impulse gas line to feed impulse gas into the gas flow enhancer. The pipe system has an outlet in order to discharge heat transfer medium from the pipe system, wherein the outlet is connected to the impulse gas line, with the result that the heat transfer medium discharged from the outlet can be fed back into the pipe system as impulse gas. The heat transfer medium drained off from the outlet is preferably guided through a compressor in order to introduce it back into the pipe system as a pressurized impulse gas.

As already explained, the recycling of the heat transfer medium into the impulse gas flow can be combined with the means for preheating the impulse gas flow. A further embodiment of the invention therefore provides that the means for preheating the impulse gas flow are connected to the impulse gas line in such a way that the heat transfer medium discharged from the outlet first emits heat to the impulse gas flow and then is guided into the impulse gas line in a section in front of the means for preheating the impulse gas flow in the flow direction of the impulse gas, wherein the heat transfer medium is introduced into the impulse gas line preferably via a compressor. In this embodiment the heat transfer medium is first guided over the means for preheating the impulse gas flow and is then fed into the impulse gas line and then, as impulse gas, flows through the means for preheating the impulse gas flow in order to be heated again. A compressor is preferably arranged in front of the means for preheating the impulse gas flow in order to increase the pressure of the recycled heat transfer medium and to feed this back into the pipe system as impulse gas. Because heat is first taken from the heat transfer medium before the latter flows through the compressor, the resulting thermal loads for the compressor are lower and the latter can be dimensioned smaller. This also contributes substantially to the cost efficiency. After leaving the compressor, the heat transfer medium, now propelled further as impulse gas, is heated again by the heat transfer medium recycled from the outlet.

The outlet, which serves to drain off some of the gaseous heat transfer medium from the system, can be placed in the system as required. If the outlet is placed, for example, behind the heat exchanger, which is connected to the high-temperature source, in the flow direction of the gas, the quantity of heat that can be transferred to the impulse gas flow is particularly large. If, on the other hand, the outlet is placed in front of the heat exchanger in the flow direction of the gas, some of the impulse gas is again extracted from the main circuit after flowing through the gas flow enhancer, with the result that it need not be heated in the heat exchanger. The heat exchanger can thereby be dimensioned smaller.

A further embodiment of the invention comprises limit values for the operating pressure of the system. Thus it is provided that the pressure of the heat transfer medium during operation is below 3 bar, preferably below 1.5 bar.

According to a further embodiment of the invention the impulse gas flow lies below 150 Nl/min (Nl/min=standard volumetric flow rate). The maximum flow of the heat transfer medium is preferably 1500 Nl/min. The system has a particularly high efficiency in the case of these operating parameters. These values apply in particular to a 1-kW fuel cell. However, the invention also applies explicitly to fuel cells with other power values. The adaptation of the operating parameters "impulse gas flow" and "maximum flow of the heat transfer medium" can be set by a person skilled in the art by means of simple power measurements.

According to the invention a row of pressure and temperature sensors as well as flow meters, which monitor and optionally control the pressure and the temperature and the volumetric flow rate of the heat transfer medium, can be provided in the pipe system.

As already mentioned in the introduction, it has become apparent that the gas circulation system is advantageous not only for heat dissipation in battery and fuel cell systems.

The possible uses of the gas circulation system are explicitly not limited only to this field of use, but are varied. As the system dispenses with moving parts, it is suitable above all for gas flows in which solids float, for example gas from coal combustion. Another use is power generation by means of solar concentrators. There, the solar energy is concentrated onto a collector (normally arranged on a tower) by a number of mirrors, whereby temperatures of several thousand degrees Celsius are achieved. Durable heat carriers are needed to discharge the heat from this collector. For this, gaseous media, such as air or helium, are suitable above all. The present invention can be used efficiently in this field of use.

DESCRIPTION OF THE FIGURES

Further features, advantages and possible uses of the present invention emerge from the following description of an embodiment example with reference to the drawings.

There are shown in:

FIG. 1 schematically shows a gas circuit according to the invention connected to a high-temperature fuel cell and a metal hydride tank.

Figure 1:
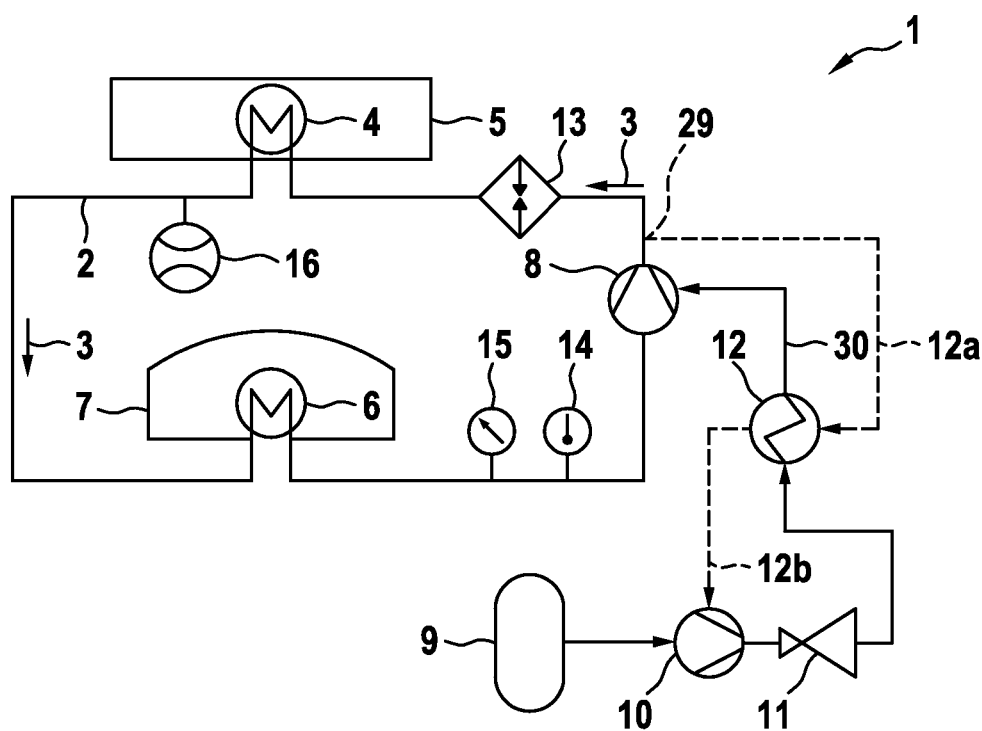
FIG. 1 a schematic view of a gas circuit according to a first embodiment of the invention.

The gas circulation system 1 comprises a pipe system 2, through which a heat transfer medium in the form of gas flows. The system is formed as a circuit and the air flows in the flow direction 3. Part of the pipe system 2 is formed as a first heat exchanger 4. The heat exchanger 4 is connected to a high-temperature fuel cell in the form of an SOFC or molten carbonate fuel cell (MCFC) or phosphoric acid fuel cell (PAFC) 5. Due to the thermal coupling between heat exchanger 4 and SOFC 5, heat from the SOFC 5 can be emitted into the heat exchanger 4 and is there transferred to the heat transfer medium flowing through the heat exchanger 4.

Spaced apart from the heat exchanger 4, the gas circulation system 1 comprises a heat sink 6 for the heat exchange with a heat consumer 7. In the embodiment example shown the heat sink 6 is provided in the form of an additional heat exchanger. The additional heat exchanger 6 is connected to a metal hydride tank 7 (heat consumer) and thermally coupled thereto. In the additional heat exchanger 6 the heat of the hot heat transfer medium is transferred to the metal hydride tank 7. However, the heat transfer medium can also heat the tank directly, if it is designed accordingly, e.g. as a dual-pipe or multi-pipe system.

Because of thermal density differences, a basic flow (natural convection) already forms in the pipe system due to the heat source (input of heat into the system) and the heat sink (discharge of heat from the system). In order to accelerate the heat transfer medium in the flow direction 3, a gas flow enhancer 8 is integrated in the circuit. In principle, various forms of gas flow enhancers are possible, thus also jet pumps or the like.

The gas flow enhancer 8 used here comprises a flow channel with an inlet opening with an inlet cross-sectional area which tapers conically in the axial direction of the pump body up to a cross-section narrowing with a minimal passage surface area. Immediately in front of this narrowest point of the flow channel there is an annular gap which is supplied with compressed gas from a compressed-gas source 9 from a pressurized annular chamber. This "auxiliary gas flow" (also called "impulse gas flow") enters the annular chamber and is deflected in the axial direction by a Coandă control surface, which is explained in more detail with reference to FIG. 2, and flows along the wall of the flow channel due to the Coandă effect. In the flow channel the flowing air causes a gas flow, which sucks in and entrains the heat transfer medium lying in front of the gap in the axial direction. The line 30 which serves to supply the gas flow enhancer 8 with impulse gas is called the impulse gas line.

In addition to the compressed-air source 9, the impulse gas line 30 comprises a compressor 10 and a control valve 11. In order to keep the heat losses of the system as low as possible, the auxiliary gas line also comprises a preheating component 12 in the form of an additional heat exchanger, which can be connected to the pipe system 2, in order to heat the impulse gas flow.

Furthermore, an electric tubular heater 13 is provided between the gas flow enhancer 8 and the heat exchanger 4 in order to compensate for heat losses possibly occurring during operation.

In addition to temperature gauges 14 and pressure gauges 15, the system also comprises volumetric flow measurement devices 16, in order to check the system parameters and optionally to adjust them to target values.

During operation the gas flow enhancer 8, supplied with compressed air from the impulse gas line 30 from the compressed-air source 9, generates an air flow of the heat transfer medium in the flow direction 3. The heat exchange with the SOFC 5 occurs in the heat exchanger 4 and the heat transfer medium is heated. The heat transfer medium then flows to the metal hydride tank 7, where the heat is emitted to the metal hydride tank 7 via the heat exchanger 6. The metal hydride tank 7 uses the heat to release the fuel for the SOFC 5.

The impulse gas flow from the compressed-air source 9 is chosen such that only a small quantity of gas is pumped into the gas circulation system 1. In order to avoid an accumulation of gas and a safety-related pressure increase in the pipe system 2, an equivalent quantity of gas is vented via an outlet 29. The gas circulation system 1 can thereby be operated with constant pressure and a pressure overloading of the system can be avoided. Via the outlet 29 the heat transfer medium can be discharged from the circulation system 1 as "exhaust gas". However, the warm heat transfer medium can also be used to heat the impulse gas flow, as will be described in the following.

As indicated with dashed lines 12a, the gas discharged from the outlet 29 can be guided to the heat exchanger 12 in order to introduce heat into the impulse gas flow. In other words: the drained-off heat transfer medium is used to preheat the impulse gas, which brings about an improvement in the energy efficiency. Most of the heat thereby remains in the circuit and the exhaust gas can be cooled down to a non-hazardous level before it is discharged from the system. As all of the energy for preheating the impulse gas flow comes from the system itself, external heating means can be dispensed with. The energy efficiency of the entire system is thereby markedly high.

However, the exhaust gas can also be recycled into the system, which is indicated by the dashed lines 12b. After the cooling in the heat exchanger 12, the cooled waste gas can be guided into the compressor 10. There the cooled heat transfer medium is compressed and flows through the impulse gas line 30 as impulse gas. The impulse gas is then heated again in the heat exchanger 12. Because of the cooled-down gas, the compressor need not be designed as a special structure for high temperatures. As the heat transfer medium is not lost, but remains in the circuit, expensive gases such as argon, nitrogen, helium etc. can also be used economically.

Of course, additional devices for temperature control of the gas flows can also be integrated in the system. Thus, for example, a heat exchanger heated with external energy can also be provided in the area of the heat exchanger 12, for example in the connection between the control valve 11 and the heat exchanger 12. An additional cooler (e.g. with air) for the connection 12b is furthermore possible, with the result that the gas arrives at the compressor 10 even colder if the record shows that the temperature is still too high.

Figure 2:
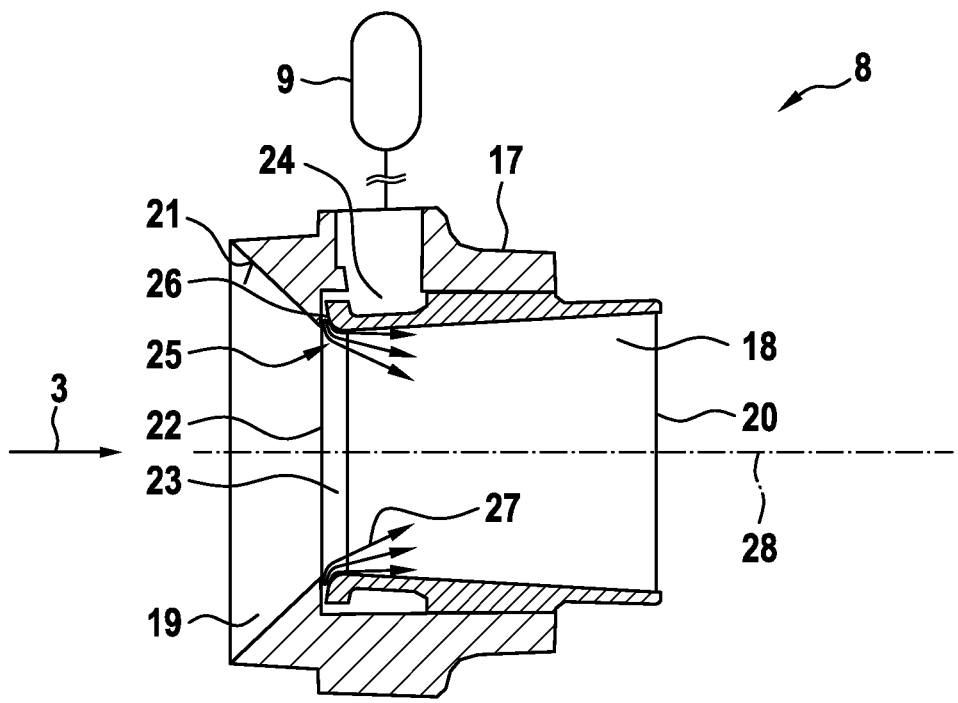
FIG. 2 a sectional view of part of the gas circuit from FIG. 1.

FIG. 2 shows the gas flow enhancer 8 from FIG. 1. The gas flow enhancer 8 has a nozzle body 17 which, in the flow direction 3, comprises a flow channel 18 with an inlet opening 19 and an outlet opening 20. The inlet opening 19 provides an inlet cross-sectional area 21 which tapers conically in the flow direction 3 up to a cross-section narrowing 22. An annular gap 23 is formed in the area of the cross-section narrowing 22 on the inner surface of the flow channel 18. The annular gap 23 is in fluid connection with an annular chamber 24. The annular chamber 24 is in fluid connection with the compressed-air source 9 (FIG. 1) and is supplied by the latter with pressurized impulse gas. The annular chamber 24 is connected to the annular gap 23 via a small annular nozzle 25.

Viewed in the flow direction 3, the inner surface of the flow channel 18 forms a curved flow control surface 26 following on from the annular nozzle 25, which is also called a Coandă control surface and which brings about a deflection of the expelled impulse gas flow, which is indicated by the arrows 27. The control surface 26 first extends, starting from the nozzle section 25, radially inwards in the direction of the centre axis 28 of the nozzle body and then extends, following its curvature, increasingly in the axial direction in the flow direction 3. In other words, the control surface has a profile which flattens out increasingly in the direction onto the centre axis 28.

When leaving the annular nozzle 25, the air blown out from the annular nozzle 25 follows the convex course of the control surface 26 which is curved in the axial direction and runs along the control surface 26, whereby the impulse gas flow, which is initially blown in radially, is deflected in the axial direction (impulse gas flow deflection 27). This mechanism known as the Coandă effect is based on the tendency of a gas jet to run along a convex surface instead of becoming detached.

Due to the deflection of the impulse gas flow in the axial direction (impulse gas flow deflection 27) in the area of the nozzle centre there is a negative pressure which sucks large quantities of heat transfer medium through the inlet opening 19. The heat transfer medium is thus accelerated in the flow channel.

The flow channel with an inner diameter which widens in the flow direction 3 is formed following on from the Coandă control surface 26 in the flow direction 3.

LIST OF REFERENCE NUMBERS

1 Gas circulation system
2 Pipe system
3 Flow direction
4 First heat exchanger
5 Fuel cell
6 Heat sink (second heat exchanger)
7 Metal hydride tank
8 Gas flow enhancer
9 Compressed-gas source (compressed-air source)
10 Compressor
11 Control valve
12 Preheating component
13 Electric tubular heater 14 Temperature gauge
15 Pressure gauge
16 Volumetric flow measurement device
17 Nozzle body
18 Flow channel
19 Inlet opening
20 Outlet opening
21 Inlet cross-sectional area
22 Cross-section narrowing
23 Annular gap
24 Annular chamber
25 Annular nozzle
26 Coandă control surface
27 Impulse gas flow deflection
28 Centre axis
29 Outlet
30 Impulse gas line

The invention claimed is:

1. A gas circulation system for transporting heat from a high-temperature source, in particular a high-temperature fuel cell, to a heat consumer, having:
- a pipe system, through which a gaseous heat transfer medium flows, wherein part of the pipe system is formed as a heat exchanger connected to the high-temperature source, in which heat is transferred from the high-temperature source into the heat transfer medium,
- wherein part of the pipe system is formed as a heat sink, in which the heat transferred to the heat transfer medium can be transferred to a heat consumer, or as a heat consumer,
- wherein one or more gas flow enhancers functioning according to the Coandă effect and/or the Venturi effect which are supplied with pressurized impulse gas are provided in the pipe system, in order to propel the heat transfer medium in the pipe system in a flow direction,
- and wherein the one or more of the gas flow enhancers, in the flow direction of the heat transfer medium, has an inlet opening with an inlet cross-sectional area which tapers conically, or with another tapering shape, in the flow direction up to a cross-section narrowing with a minimal passage surface area.

2. The gas circulation system according to claim 1, wherein means for preheating the impulse gas flow are provided.

3. The gas circulation system according to claim 2, wherein the pipe system has an outlet in order to discharge heat transfer medium from the pipe system, wherein the outlet is connected to the means for preheating the impulse gas flow, with the result that the heat of the discharged heat transfer medium can be transferred to the impulse gas in order to preheat it.

4. The gas circulation system according to claim 1, wherein the gas flow enhancer is connected to an impulse gas line for supplying impulse gas, wherein the pipe system has an outlet in order to discharge heat transfer medium from the pipe system, wherein the outlet is connected to the impulse gas line, with the result that the heat transfer medium discharged from the outlet is fed back into the pipe system as impulse gas.

5. The gas circulation system according to claim 3, wherein the means for preheating the impulse gas flow are connected to the impulse gas line in such a way that the heat transfer medium discharged from the outlet first emits heat to the impulse gas flow and then is guided into the impulse gas line in front of the means for preheating the impulse gas flow in the flow direction, wherein the heat transfer medium is introduced into the impulse gas line preferably via a compressor.

6. The gas circulation system according to claim 1, wherein the gas flow enhancer comprises a nozzle body with a flow channel, wherein the flow channel has an annular gap, which is supplied with the pressurized impulse gas from an annular chamber,
wherein, following on from the annular gap in the flow direction, the flow channel forms a Coandă control surface which is formed in such a way that the impulse gas flow is deflected in the flow direction.

7. The gas circulation system according to claim 6, wherein the Coandă control surface is curved in the flow direction.

8. The gas circulation system according to claim 6, wherein a section following on from the Coandă control surface with an inner diameter which widens in the flow direction.

9. The gas circulation system according to claim 1, wherein the gas circulation system is connected to a high-temperature fuel cell, wherein a waste gas flow of the high-temperature fuel cell runs over the heat exchanger.

10. The gas circulation system according to claim 1, wherein a metal hydride tank is connected to the heat sink, wherein the heat sink is preferably formed as a second heat exchanger.

11. The gas circulation system according to claim 1, wherein an air heater is provided in the pipe system.

12. The gas circulation system according to claim 1, wherein the pressure of the heat transfer medium is below 3 bar.

13. The gas circulation system according to claim 1, wherein the impulse gas flow lies below 150 Nl/min.

14. The gas circulation system according to claim 1, wherein the volumetric flow rate of the heat transfer medium is at most 1500 Nl/min.

* * * * *